US012359469B2

(12) United States Patent
Gireesha et al.

(10) Patent No.: US 12,359,469 B2
(45) Date of Patent: Jul. 15, 2025

(54) ANTI-BARRICADE ASSEMBLY

(71) Applicant: Schlage Lock Company LLC, Carmel, IN (US)

(72) Inventors: Benaka Gireesha, Udupi (IN); Pradeepkumar Balasubramaniam, Tiruppur District (IN); Akhil Ramesh Hamsagar, Bangalore (IN)

(73) Assignee: Schlage Lock Company LLC, Carmel, IN (US)

( * ) Notice: Subject to any disclaimer, the term of this patent is extended or adjusted under 35 U.S.C. 154(b) by 868 days.

(21) Appl. No.: 17/507,251

(22) Filed: Oct. 21, 2021

(65) Prior Publication Data

US 2023/0127226 A1 Apr. 27, 2023

(51) Int. Cl.
*E05B 63/00* (2006.01)
*E05B 1/00* (2006.01)
(Continued)

(52) U.S. Cl.
CPC ........ *E05B 63/0069* (2013.01); *E05B 13/005* (2013.01); *E05B 1/003* (2013.01); *E05B 2015/105* (2013.01)

(58) Field of Classification Search
CPC .... E05B 63/0069; E05B 13/005; E05B 1/003; E05B 2015/105; E05B 1/0007;
(Continued)

(56) References Cited

U.S. PATENT DOCUMENTS 416,310 A * 12/1889 Winchester ............. E05B 3/003 292/352
771,608 A * 10/1904 Chaffee ............... E05D 11/1078 172/683
(Continued)

FOREIGN PATENT DOCUMENTS

EP 0668424 A1 * 8/1995
EP 0908587 A1 * 4/1999

OTHER PUBLICATIONS

Canadian Examination Report, Canadian Intellectual Property Office, Canadian Patent Application No. 3,181,906, Apr. 12, 2024, 4 pages.

*Primary Examiner* — Kristina R Fulton
*Assistant Examiner* — Faria F Ahmad
(74) *Attorney, Agent, or Firm* — Taft Stettinius & Hollister LLP

(57) ABSTRACT

An example lockset generally includes a housing, a bolt, a turnhub, and a spindle. The bolt is mounted in the housing for movement between an extended position and a retracted position. The turnhub is rotatably mounted in the housing and engaged with the bolt. Rotation of the turnhub in a bolt-extending direction drives the bolt toward the extended position, and rotation of the turnhub in a bolt-retracting direction opposite the bolt-extending direction drives the bolt toward the retracted position. The spindle engaged with the turnhub, is operable to exert torque on the turnhub in the bolt-retracting direction, and is selectively operable to exert torque on the turnhub in the bolt-extending direction. The
(Continued)

housing includes a pair of stops configured to limit rotation of the spindle to a predetermined angular range.

21 Claims, 10 Drawing Sheets

(51) Int. Cl.
*E05B 13/00* (2006.01)
*E05B 15/10* (2006.01)

(58) Field of Classification Search
CPC ...... E05B 13/004; E05B 15/04; E05B 13/101; E05B 55/06; E05B 2009/046; E05B 17/04; E05B 17/044
See application file for complete search history.

(56) References Cited

U.S. PATENT DOCUMENTS

| | | | | | |
|---|---|---|---|---|---|
| 1,272,967 | A * | 7/1918 | Kirsch | E05B 55/00 70/462 |
| 2,645,926 | A * | 7/1953 | Erkkila | E05B 55/12 70/151 R |
| 5,469,723 | A * | 11/1995 | Litwin | E05B 55/00 70/387 |
| 5,787,743 | A | 8/1998 | Weigard | |
| RE36,209 | E | 5/1999 | Walls | |
| 6,223,567 | B1 * | 5/2001 | Fadul | E05B 55/005 70/277 |
| 6,393,878 | B1 * | 5/2002 | Fayngersh | E05B 63/044 292/169.14 |
| 6,425,273 | B1 | 7/2002 | Kim et al. | |
| 6,543,264 | B2 * | 4/2003 | Frolov | E05B 47/0688 70/222 |
| 6,619,085 | B1 * | 9/2003 | Hsieh | E05B 47/026 292/144 |
| 7,128,191 | B2 | 10/2006 | Fisher | |
| 7,699,378 | B2 * | 4/2010 | Smith | E05F 1/1223 49/386 |
| 7,963,134 | B2 | 6/2011 | Rafferty et al. | |
| 8,201,858 | B1 * | 6/2012 | Moon | E05B 15/0013 292/33 |
| 8,353,188 | B1 | 1/2013 | Byerly et al. | |
| 9,834,956 | B2 | 12/2017 | Hogan | |
| 10,597,902 | B2 * | 3/2020 | Guo | E05B 17/045 |
| 10,612,273 | B2 | 4/2020 | Litwinski et al. | |
| 10,626,634 | B2 | 4/2020 | Verderaime et al. | |
| 2005/0039504 | A1 * | 2/2005 | Smith | E05B 13/004 70/134 |
| 2006/0042336 | A1 * | 3/2006 | Smith | E05B 13/004 70/432 |
| 2010/0251788 | A1 * | 10/2010 | Lin | E05B 13/005 70/472 |
| 2013/0031940 | A1 * | 2/2013 | Romero | E05B 13/004 70/278.1 |
| 2015/0275544 | A1 * | 10/2015 | Karnutsch | E05B 1/003 292/336.3 |
| 2016/0017634 | A1 * | 1/2016 | Parker | E05B 1/003 292/357 |
| 2016/0251876 | A1 * | 9/2016 | Carlsson | E05B 1/003 70/445 |
| 2019/0242154 | A1 * | 8/2019 | Verderaime | E05B 13/005 |
| 2020/0248476 | A1 | 8/2020 | Verderaime et al. | |
| 2020/0256087 | A1 * | 8/2020 | Balasubramaniam | E05B 15/0033 |
| 2020/0392761 | A1 * | 12/2020 | Gómez García et al. | E05B 63/16 |
| 2021/0054663 | A1 * | 2/2021 | Cheng | E05B 63/12 |
| 2021/0062544 | A1 * | 3/2021 | Lien | E05B 63/08 |
| 2021/0214972 | A1 | 7/2021 | Szczerkowski et al. | |
| 2023/0392413 | A1 * | 12/2023 | Hiremath | E05B 15/0033 |
| 2024/0093531 | A1 * | 3/2024 | Chen | E05B 47/026 |

* cited by examiner

ANTI-BARRICADE ASSEMBLY

TECHNICAL FIELD

The present disclosure generally relates to locksets, and more particularly but not exclusively relates to anti-barricade assemblies for locksets.

BACKGROUND

In certain conventional locksets, it is often possible for a person on the egress side of the door to prevent the door from opening by holding the thumbturn in place, thereby preventing retraction of the deadbolt and "barricading" the door against entry. In such conventional locksets, holding the thumbturn in place can prevent an authorized person from retracting the deadbolt from the non-egress side of the door, such as with a key. In some institutions, such as mental health facilities, locksets with anti-barricade mechanisms are installed to the doors in order to prevent a person on the egress side of the door from barricading the door in this manner. However, many conventional anti-barricade mechanisms suffer from certain drawbacks and limitations, such as those regarding the efficacy of the anti-barricade mechanism. For these reasons among others, there remains a need for further improvements in this technological field.

SUMMARY

An example lockset generally includes a housing, a bolt, a turnhub, and a spindle. The bolt is mounted in the housing for movement between an extended position and a retracted position. The turnhub is rotatably mounted in the housing and engaged with the bolt. Rotation of the turnhub in a bolt-extending direction drives the bolt toward the extended position, and rotation of the turnhub in a bolt-retracting direction opposite the bolt-extending direction drives the bolt toward the retracted position. The spindle engaged with the turnhub, is operable to exert torque on the turnhub in the bolt-retracting direction, and is selectively operable to exert torque on the turnhub in the bolt-extending direction. The housing includes a pair of stops configured to limit rotation of the spindle to a predetermined angular range. Further embodiments, forms, features, and aspects of the present application shall become apparent from the description and figures provided herewith.

DETAILED DESCRIPTION OF ILLUSTRATIVE EMBODIMENTS

Figure 1:
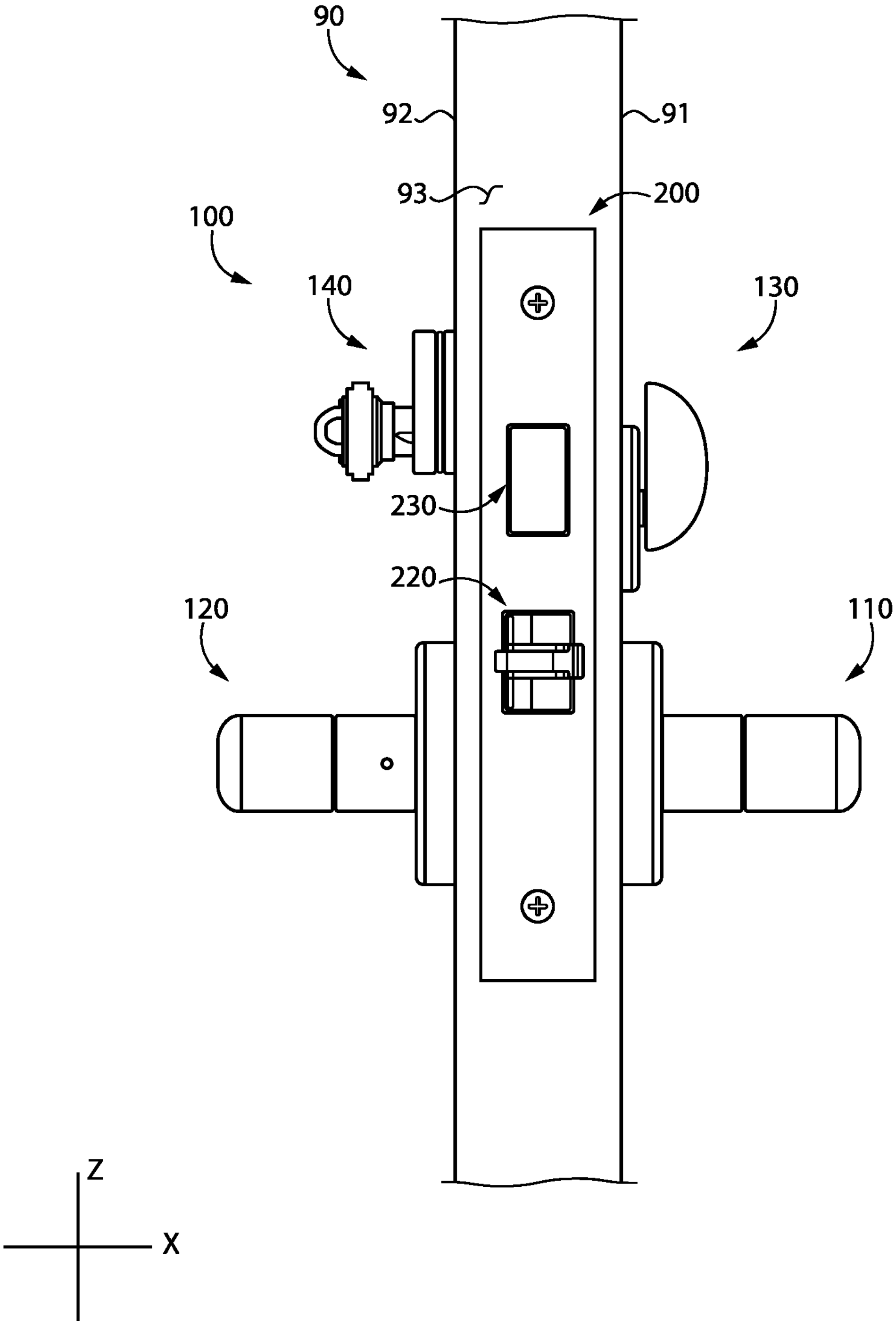
FIG. 1 is a side view of a lockset according to certain embodiments installed to a door.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, the terms "longitudinal," "lateral," and "transverse" may be used to denote motion or spacing along three mutually perpendicular axes, wherein each of the axes defines two opposite directions. In the coordinate system illustrated in FIG. 2, the X-axis defines first and second longitudinal directions (including a proximal direction and a distal direction), the Y-axis defines first and second lateral directions, and the Z-axis defines first and second transverse directions. These terms are used for ease and convenience of description, and are without regard to the orientation of the system with respect to the environment. For example, descriptions that reference a longitudinal direction may be equally applicable to a vertical direction, a horizontal direction, or an off-axis orientation with respect to the environment.

Furthermore, motion or spacing along a direction defined by one of the axes need not preclude motion or spacing along a direction defined by another of the axes. For example, elements that are described as being "laterally offset" from one another may also be offset in the longitudinal and/or transverse directions, or may be aligned in the longitudinal and/or transverse directions. The terms are therefore not to be construed as limiting the scope of the subject matter described herein to any particular arrangement unless specified to the contrary.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Items listed in the form of "A, B, and/or C" can also mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown in certain specific arrangements and/or orderings. However, it should be appreciated that such specific arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

With reference to FIG. 1, illustrated therein is a door 90 having installed thereto a lockset 100 according to certain embodiments. The door 90 has an inner or egress side 91, an outer or non-egress side 92 opposite the egress side 91, and a latch edge 93 extending between the egress side 91 and the non-egress side 92. The lockset 100 generally includes an inside latchbolt actuator 110 installed to the egress side 91, an outside latchbolt actuator 120 installed to the non-egress side 92, an inside deadbolt actuator 130 installed to the egress side 91, an outside deadbolt actuator 140 installed to the non-egress side 92, and a mortise assembly 200 installed within a mortise cutout of the door 90.

Figure 2:
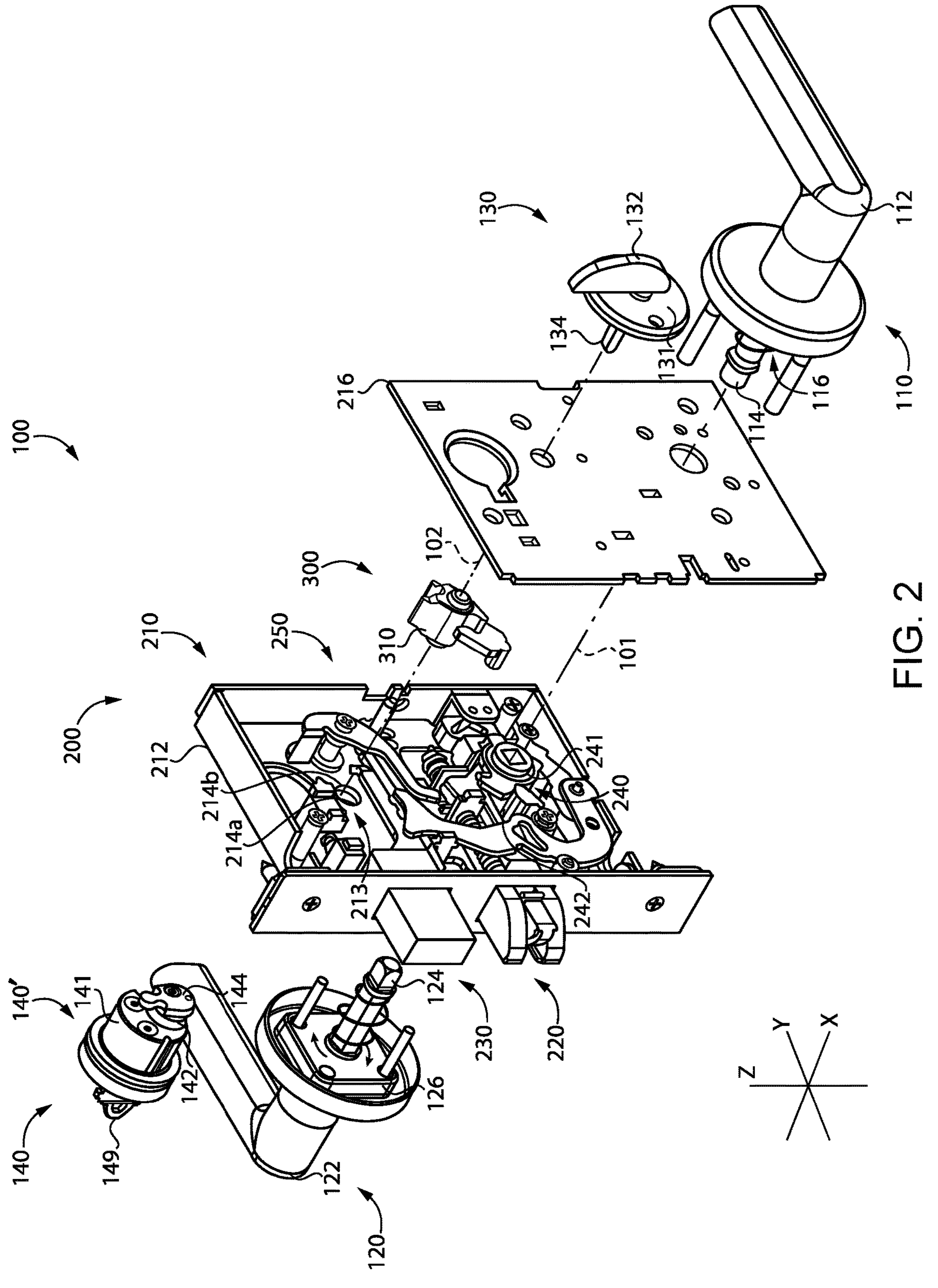
FIG. 2 is an exploded assembly view of the lockset, which includes a mortise assembly according to certain embodiments.

With additional reference to FIG. 2, the mortise assembly 200 generally includes a housing 210, a latchbolt 220 operable to latch the door 90 in a closed position, a deadbolt 230 operable to lock the door 90 in its closed position, a latchbolt actuation assembly 240 operable to extend and retract the latchbolt 220, and a deadbolt actuation assembly 250 operable to extend and retract the deadbolt 230, and may further include a lock mechanism 260 operable to selectively prevent the outside latchbolt actuator 120 from retracting the latchbolt 220. As described herein, the deadbolt actuation assembly 250 includes, among other elements and features, an anti-barricade mechanism 300 according to certain embodiments, which in turn includes a turnhub 310.

The inside latchbolt actuator 110 generally includes an inside handle 112, an inside spindle 114 rotationally coupled with the inside handle 112 and extending along a first longitudinal axis 101, and an inside spring cage 116 biasing the inside handle 112 toward a home position. As described herein, rotation of the inside handle 112 from the home position to a rotated position serves to retract the latchbolt 220 by actuating the latchbolt actuation assembly 240. In the illustrated form, the inside handle 112 is provided in the form of a lever. It is also contemplated that the handle 112 may be provided in another form, such as that of a knob.

The outside latchbolt actuator 120 generally includes an outside handle 122, an outside spindle 124 rotationally coupled with the outside handle 122 and extending along the first longitudinal axis 101, and an outside spring cage 126 biasing the outside handle 122 toward a home position. As described herein, when the lockset 100 is in an unlocked state, rotation of the outside handle 122 from the home position to a rotated position serves to retract the latchbolt 220 by actuating the latchbolt actuation assembly 240. In the illustrated form, the outside handle 122 is provided in the form of a lever. It is also contemplated that the handle 122 may be provided in another form, such as that of a knob.

The inside deadbolt actuator 130 generally includes a baseplate 131, an actuator 132 rotatably mounted to the baseplate 131, and a stem 134 rotationally coupled with the actuator 132 and extending along a second longitudinal axis 102. As described herein, rotation of the actuator 132 in opposite directions serves to extend and retract the deadbolt 230 by actuating the deadbolt actuation assembly 250. In the illustrated form, the actuator 132 is provided in the form of a thumbturn. It is also contemplated that the actuator 132 may be provided in another form, such as that of a knob or lever.

In the illustrated form, the outside deadbolt actuator 140 comprises a lock cylinder 140' that is operable by a key 149. The lock cylinder 140' generally includes a shell 141, a plug 142 rotatably mounted in the shell 141, a cam 144 rotationally coupled with the plug 142, and a tumbler assembly operable to selectively prevent rotation of the plug 142 relative to the shell 141. When the proper key 149 is inserted into a keyway of the plug 142, the plug 142 is rotatable relative to the shell 141 to thereby actuate the deadbolt actuation assembly 250. When the proper key 149 is not inserted into the plug 142, the tumbler assembly prevents rotation of the plug 142 relative to the shell 141. While the illustrated outside deadbolt actuator 140 comprises a lock cylinder 140', it is also contemplated that the outside deadbolt actuator 140 may take another form, such as one that is actuated by a tool (e.g., a hex key) or one that is manually actuated (e.g., a thumbturn similar to the inside deadbolt actuator 140).

The housing 210 generally includes a case 212 and a cover 216 operable to at least partially enclose internal components of the mortise assembly 200 within the housing 210. The case 212 includes a first support opening 213, and the cover 216 includes a second support opening 217. As described herein, the housing 210 further includes a pair of stops **214*a*, 214*b* that serve to limit rotation of a spindle 320 of the anti-barricade mechanism 300**.

Figure 3:
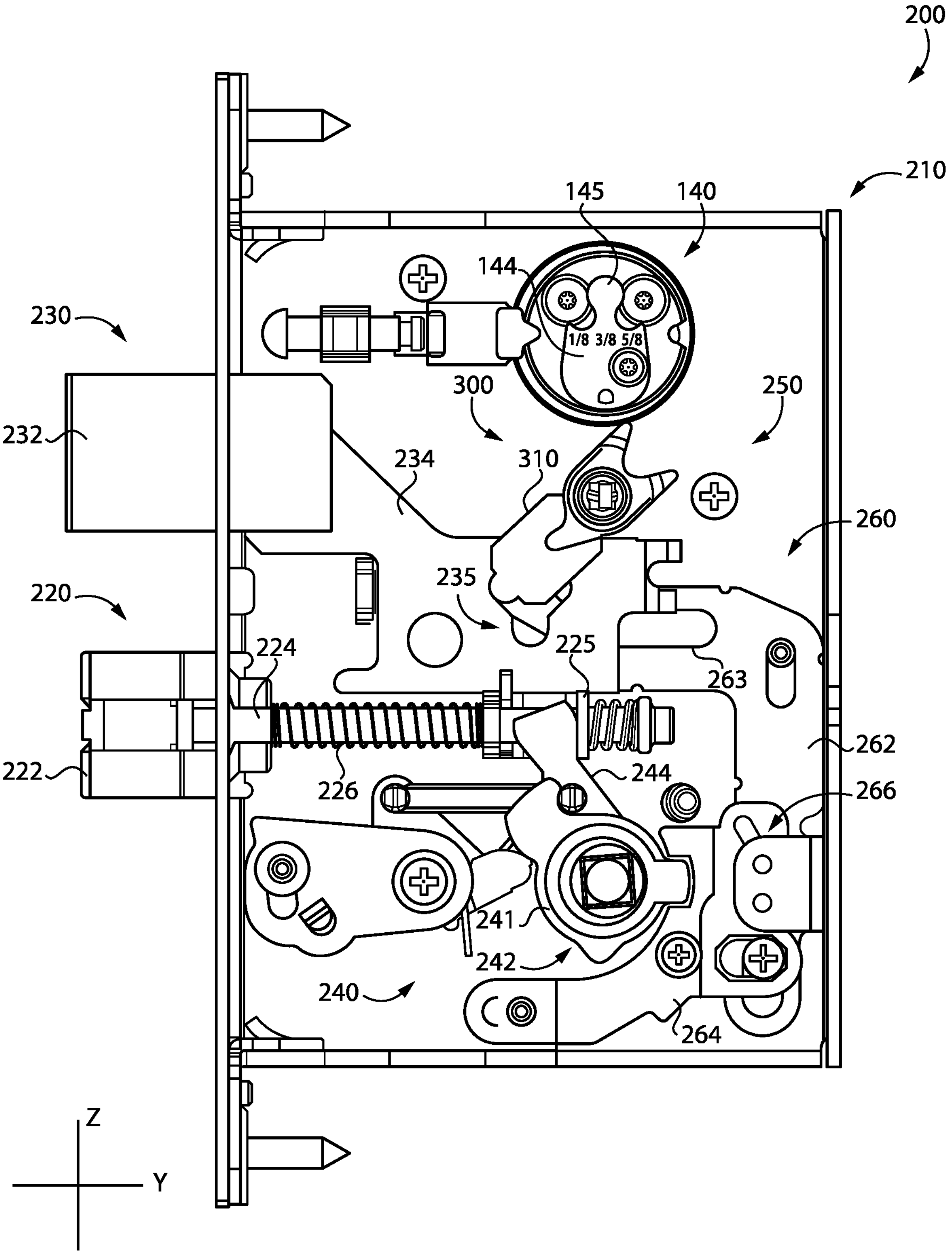
FIG. 3 is a plan view of the mortise assembly, which includes an anti-barricade mechanism according to certain embodiments.

With additional reference to FIG. 3, the latchbolt 220 generally includes a latchbolt head 222 and a tailpiece 224 extending from the latchbolt head 222 into the housing 210. A spring 226 is engaged between the latchbolt head 222 and the housing 210, and biases the latchbolt 220 toward an extended position. The tailpiece 224 includes a bracket 225 that engages the latchbolt actuation assembly 240 to facilitate retraction of the latchbolt 220 as described herein.

The deadbolt 230 includes a deadbolt head 232 and an actuator plate 234 extending from the deadbolt head 232 into the housing 210. The actuator plate 234 includes an opening 235 into which a finger 317 (FIGS. 7 and 8) of the turnhub 310 extends to facilitate retraction of the deadbolt 230 as described herein.

The latchbolt actuation assembly 240 generally includes an inside hub 241 and an outside hub 242, each of which is independently rotatable and independently operable to pivot a retractor 244. The retractor 244 is engaged with the bracket

225 such that pivoting of the retractor 244 from a home position to a pivoted position retracts the latchbolt 220. The inside hub 241 is rotationally coupled with the inside spindle 114 such that the inside handle 112 is operable to rotate the inside hub 241, thereby pivoting the retractor 244 and retracting the latchbolt 220. The outside hub 242 is rotationally coupled with the outside spindle 124 such that the outside handle 122 is operable to rotate the outside hub 242, thereby pivoting the retractor 244 and retracting the latchbolt 220. As described herein, such rotation of the outside hub 242 may be selectively prevented by the lock mechanism 260.

The lock mechanism 260 generally includes a link 262 and a catch 264 engaged with the link 262 via a cam mechanism 266 such that transverse (Z-direction) movement of the link 262 is correlated with lateral (Y-direction) movement of the catch 264. The link 262 is engaged with the turnhub 310 such that the turnhub 310 is operable to move the link 262 transversely between a lock position and an unlock position, and includes a slot 263 that receives the finger 317 to facilitate such transverse movement. The cam mechanism 266 converts this transverse movement of the link 262 to lateral motion of the catch 264, thereby moving the catch 264 between a holding position and a release position. When in the holding position, the catch 264 engages the outside hub 242 and prevents the outside handle 122 from retracting the latchbolt 220. When in the release position, the catch 264 disengages from the outside hub 242 and permits the outside handle 122 to retract the latchbolt 220.

Figure 4:
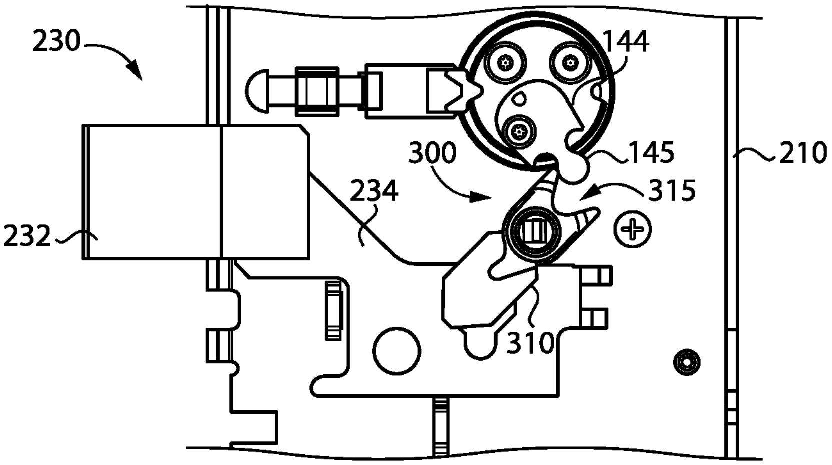
FIG. 4 is a plan view of a portion of the lockset in a deadbolt-extended state.
Figure 5:
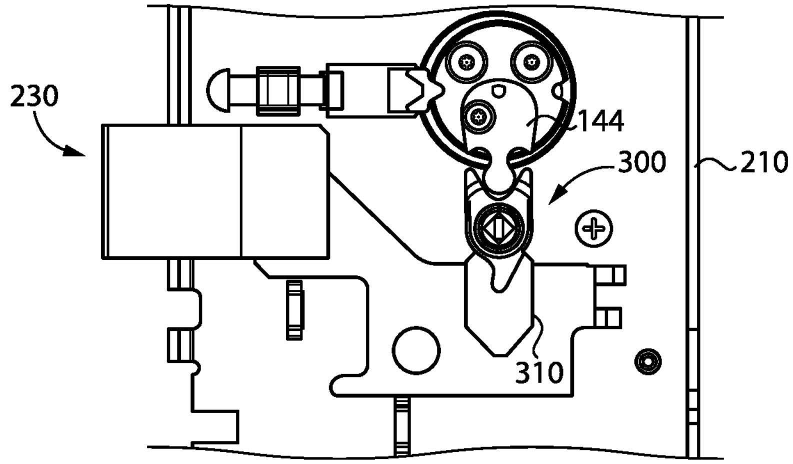
FIG. 5 is a plan view of a portion of the lockset in a transitional state.
Figure 6:
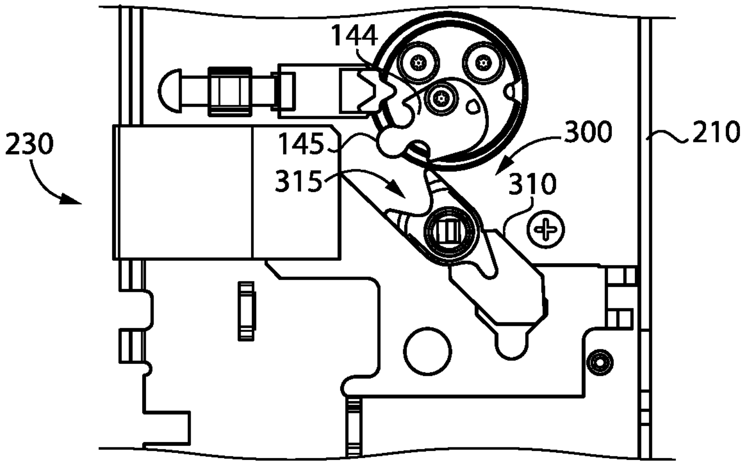
FIG. 6 is a plan view of a portion of the lockset in a deadbolt-retracted state.

With additional reference to FIGS. 4-6, illustrated therein is a portion of the lockset 100 during movement of the deadbolt 230 from an extended position (FIG. 4), through an intermediate position (FIG. 5), to a retracted position (FIG. 6). While this actuation of the deadbolt 230 will be described primarily with respect to such actuation by the outside deadbolt actuator 140, it will become apparent that such actuation may also be performed by the inside deadbolt actuator 130.

A deadbolt retraction procedure may begin with the deadbolt 230 in the extended position illustrated in FIG. 4. In this state, the cam 144 is in a home position, the turnhub 310 is in a locking position, and the deadbolt 230 is in the extended position. From this state, the cam 144 may be rotated in a deadbolt-retracting direction (clockwise in FIGS. 4-6) toward a pivoted position (FIG. 6). Such rotation of the cam 144 causes an arm 145 of the cam 144 to enter a recess 315 of the turnhub 310, thereby rotating the turnhub 310 and retracting the deadbolt 230 to the position illustrated in FIG. 6.

A deadbolt extension procedure may begin with the deadbolt 230 in the retracted position illustrated in FIG. 6. In this state, the cam 144 is in its pivoted position, the turnhub 310 is in an unlocking position, and the deadbolt 230 is in the retracted position. From this state, the cam 144 may be rotated in a deadbolt-extending direction (counter-clockwise in FIGS. 4-6) toward its home position (FIG. 4). Such rotation of the cam 144 causes the arm 145 of the cam 144 to enter the recess 315 of the turnhub 310, thereby rotating the turnhub 310 and extending the deadbolt 230 to the position illustrated in FIG. 4.

As should be evident from the foregoing, extension and retraction of the deadbolt 230 can be effected by rotating the turnhub 310 between its locking position (FIG. 4) and its unlocking position (FIG. 6). Moreover, such rotation of the turnhub 310 can be provided by actuating the outside deadbolt actuator 140. As described herein, the inside deadbolt actuator 130 is also operable to rotate the turnhub 310 from its locking position to its unlocking position, and is selectively operable to rotate the turnhub 310 from its unlocking position to its locking position.

Figure 7:
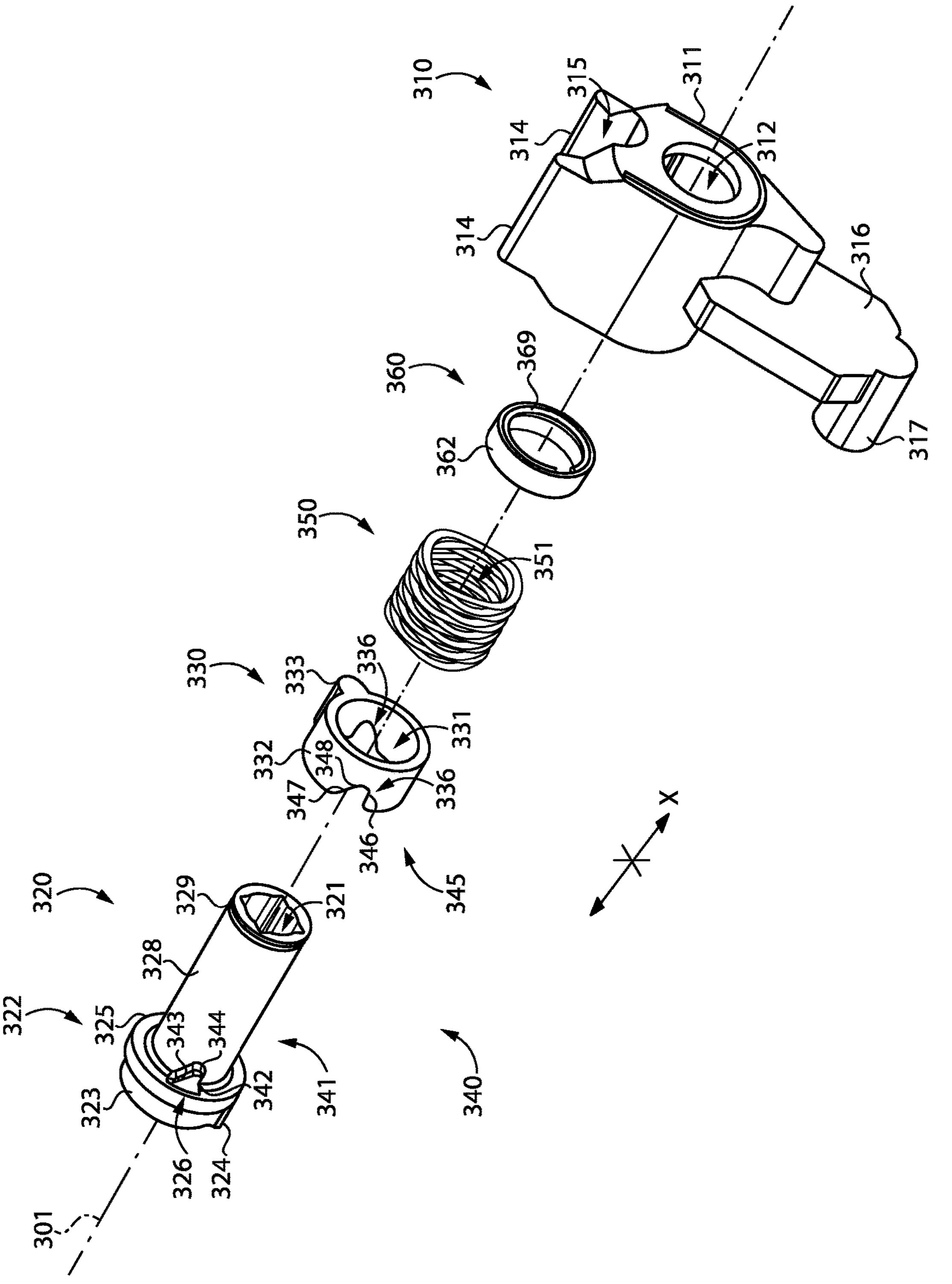
FIG. 7 is a first exploded assembly view of the anti-barricade mechanism.
Figure 8:
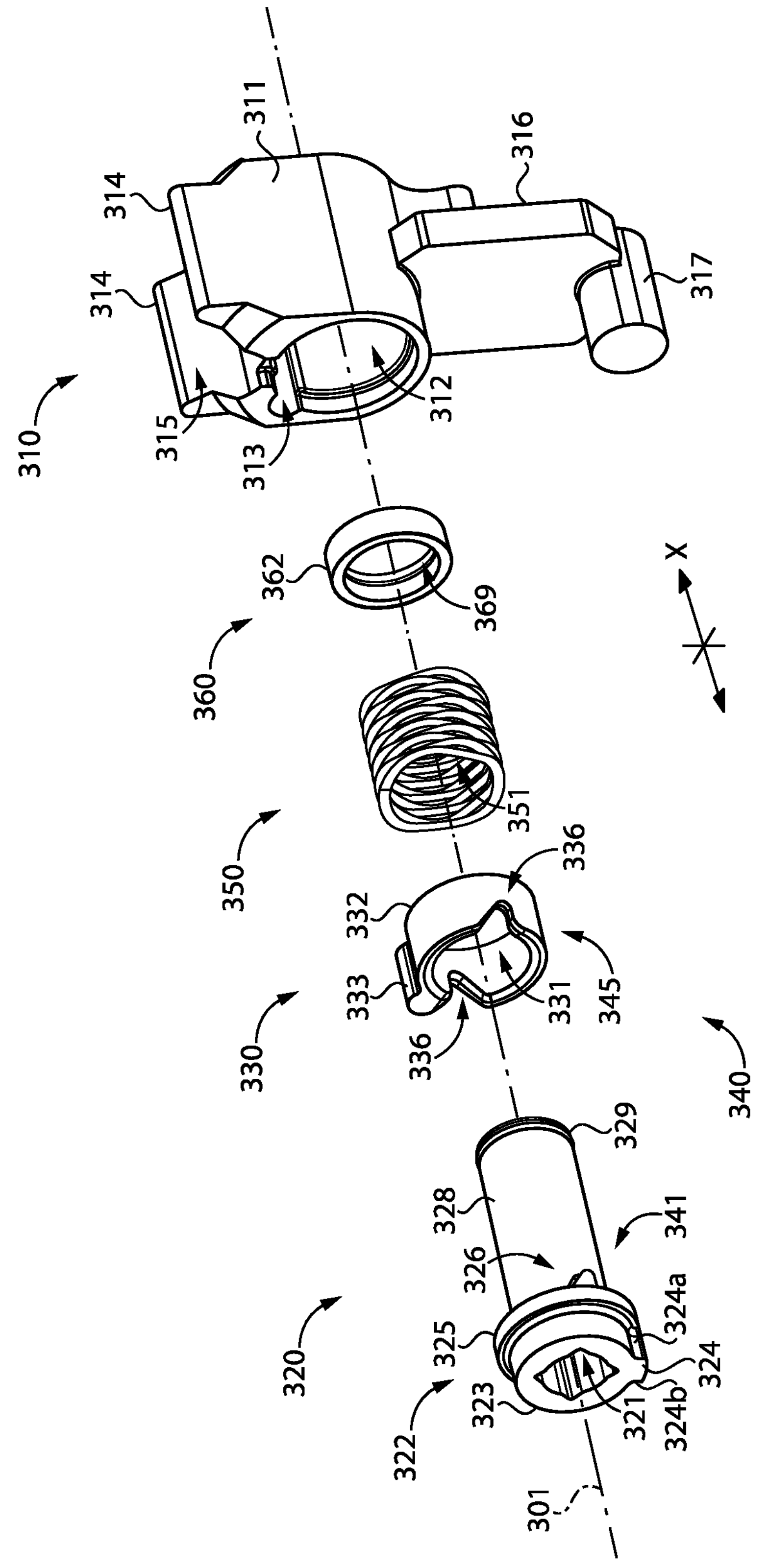
FIG. 8 is a second exploded assembly view of the anti-barricade mechanism.
Figure 10:
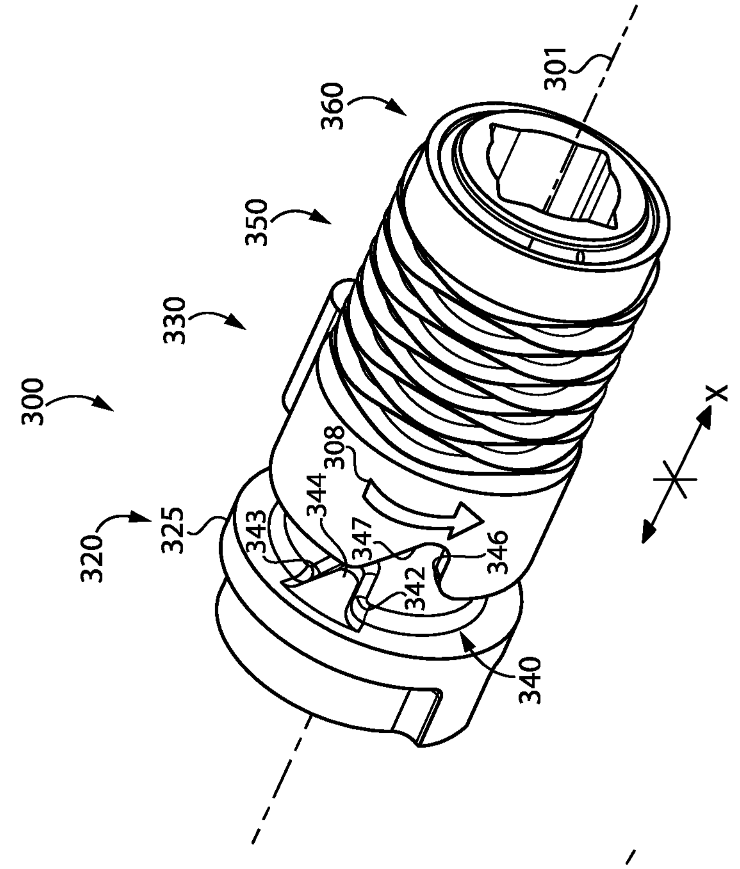
FIG. 10 is a perspective view of a portion of the anti-barricade mechanism in a decoupling state.

With additional reference to FIGS. 7 and 8, the anti-barricade mechanism 300 has a longitudinal rotational axis 301, which in the illustrated form is generally coincident with the second longitudinal axis 102 of the lockset 100. For ease and convenience of description, the longitudinal axis 301 may be considered to define a proximal direction (generally to the left in FIGS. 7 and 8) and an opposite distal direction (generally to the right in FIGS. 7 and 8). The anti-barricade mechanism 300 generally includes the turnhub 310, a spindle 320 rotatably mounted in the turnhub 310, a collar 330 slidably mounted in the turnhub 310, and a clutch mechanism 340 configured to selectively transmit rotation of the spindle 320 to the collar 330. As described herein, the illustrated clutch mechanism 340 includes a first cam component 341 defined by the spindle 320 and a second cam component 345 defined by the collar 330, and the anti-barricade mechanism 300 further includes a bias member 350 urging the cam components 341, 345 into engagement with one another. The anti-barricade mechanism 300 may further include a retention member 360 that maintains the relative positions of the spindle 320, the collar 330, and the bias member 350.

The turnhub 310 is mounted for rotation about the longitudinal rotational axis 301, and generally includes a body portion 311 defining a chamber 312, a pair of projections 314 extending from one side of the body portion 311 such that the recess 315 is defined between the projections 314, and an arm 316 extending from another side of the body portion 311. The chamber 312 includes a longitudinally-extending groove 313 that receives a spline 333 of the collar 330 to thereby rotationally couple the turnhub 310 and the collar 330 while permitting limited longitudinal movement of the collar 330 relative to the turnhub 310. The arm 316 includes the finger 317, which projects through the opening 235 in the deadbolt retraction plate 234 and into the slot 263 in the link 262.

The spindle 320 is mounted within the turnhub 310, and generally includes a proximal base portion 322, a post 328 extending distally from the base portion 322, and an opening 321 configured to receive the stem 134 of the inside deadbolt actuator 130 for rotational coupling of the spindle 320 with the thumbturn actuator 132. While the illustrated opening 321 extends through the entire length of the spindle 320, it is also contemplated that the opening 321 may instead be provided as a blind opening that extends proximally from the distal end of the post 328. The illustrated base portion 322 generally includes a circular boss 323 and a spline 324 extending radially from the circular boss 323. As described herein, the base portion 322 is received in the support opening 213 and aids in limiting the angular range through which the spindle 320 is operable to rotate. An annular flange 325 separates the base portion 322 from the post 328, and one or more projections 326 extend distally from the flange 325. As described herein, the one or more projections 326 at least partially define the first cam component 341, and aid in selectively transmitting rotation of the spindle 320 to the collar 330.

The collar 330 is mounted within the turnhub 310, and generally includes an annular body portion 332 defining an opening 331, and the spline 333, which extends radially from the annular body portion 332. The spindle post 328 extends through the opening 331 such that the collar 330 is operable to slide longitudinally relative to the spindle 320.

Formed in a proximal side of the collar 330 is at least one recess 336, each of which is configured to receive a corresponding projection 326, and at least partially defines the second cam component 345.

As noted above, the clutch mechanism 340 generally includes a first cam component 341 and a second cam component 345. In the illustrated form, the spindle 320 defines or otherwise comprises the first cam component 341, and the collar 330 defines or otherwise comprises the second cam component 345. In the illustrated example, the first cam component 341 is a male cam component defined at least in part by a projection 326 of the spindle 320, and the second cam component 345 is a female component defined at least in part by a recess 336 of the collar 330. It is also contemplated that this configuration may be reversed, such that the cam component of the spindle 320 is a female cam component that receives a male second cam component of the collar 330.

The first cam component 341 generally includes a first shoulder 342 and a first ramp 343 that meets the first shoulder 342 at a first apex 344. Similarly, the second cam component 345 generally includes a second shoulder 346 and a second ramp 347 that meets the second shoulder 346 at a second apex 348. The shoulders 342, 346 extend generally in the longitudinal direction, while the ramps 343, 347 are oblique relative to the longitudinal axis 301 or helical about the longitudinal axis 301. As described herein, the clutch mechanism 340 is configured to cause the collar 330 to rotate in a first rotational direction in response to rotation of the spindle 320 in the first rotational direction, and to selectively cause the collar 330 to rotate in a second rotational direction in response to rotation of the spindle 320 in the second rotational direction.

The bias member 350 is seated in the turnhub chamber 312, and is positioned on a distal side of the collar 330 such that the bias member 350 proximally biases the collar 330 toward engagement with the annular flange 325, thereby urging the cam components 341, 345 toward engagement with one another. The illustrated bias member 350 defines an opening 351 through which the post 328 extends to thereby support the bias member 350. In the illustrated form, the bias member 350 is provided in the form of a wave spring. It is also contemplated that the bias member 350 may be provided as another form of compression spring, or as another form of bias member capable of urging the cam components 341, 345 toward engagement with one another. For example, the bias member 350 may comprise an extension spring, a leaf spring, a torsion spring, an elastic member, and/or one or more magnets.

The retention member 360 is mounted to a distal end portion of the post 328 such that the collar 330 and the bias member 350 are captured between the flange 325 and the retention member 360. While other forms are contemplated, the illustrated retention member 360 generally includes a ring 362 and a circlip 369. The circlip 369 engages a channel 329 formed in the distal end portion of the post 328 to thereby limit distal movement of the collar 330, bias member 350, and ring 362 relative to the spindle 320.

Figure 9:
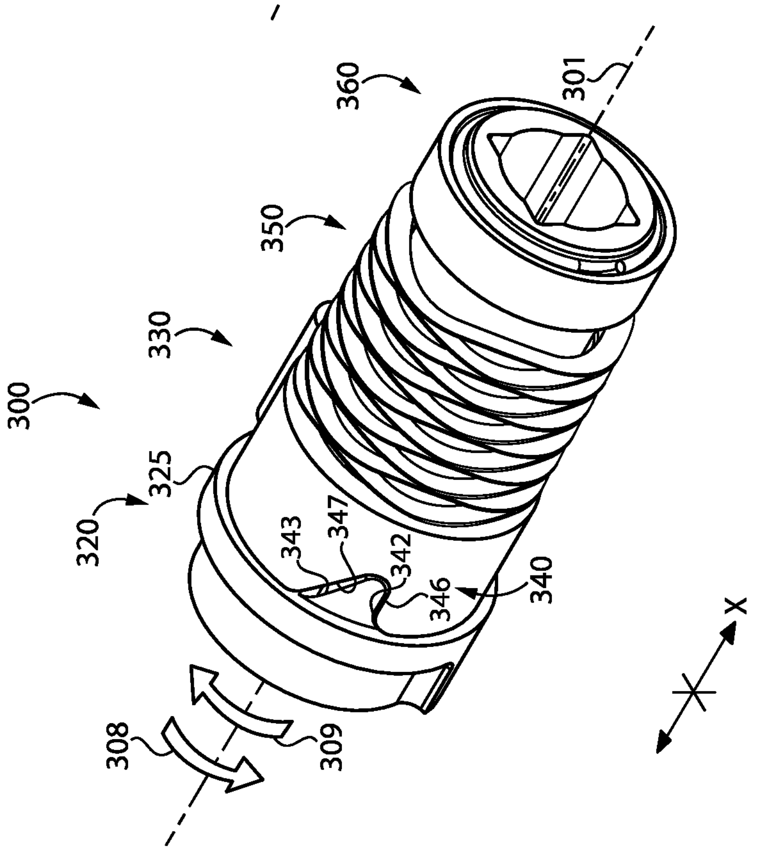
FIG. 9 is a perspective view of a portion of the anti-barricade mechanism in a coupling state.

With additional reference to FIG. 9, illustrated therein is the anti-barricade mechanism 300 during a typical operation of extending and/or retracting the deadbolt 230 via the inside deadbolt actuator 130. For purposes of clarity, the turnhub 310 is omitted from the illustration of FIG. 9. With the lockset 100 assembled, the stem 134 extends into the opening 321 of the spindle 320 such that the spindle 320 is rotationally coupled with the actuator 132. Thus, rotation of the actuator 132 in either rotational direction will cause a corresponding rotation of the spindle 330. More particularly, an unlocking rotation of the actuator 132 in an unlocking direction 308 will cause a corresponding rotation of the spindle 320 in the unlocking direction 308, and a locking rotation of the actuator 132 in a locking direction 309 opposite the unlocking direction 308 will cause a corresponding rotation of the spindle 320 in the locking direction 309.

During a typical unobstructed unlocking procedure, the deadbolt 230 can be moved from its extended position to its retracted position by each and either of the deadbolt actuators 130, 140. For retraction of the deadbolt 230 from the non-egress side 92, the outside deadbolt actuator 140 may be actuated to rotate the turnhub 310 in the unlocking direction, thereby retracting the deadbolt 230 as described above with reference to FIGS. 4-6. For retraction of the deadbolt 230 from the egress side 91, the inside actuator 132 may be rotated in the unlocking direction 308, thereby causing a corresponding rotation of the spindle 320 in the unlocking direction 308. Such rotation of the spindle 320 in the unlocking direction 308 causes a corresponding rotation of the turnhub 310 in the unlocking direction 308. More particularly, the unlocking torque is transmitted from the spindle 320 to the collar 330 via engagement of the shoulders 342, 346, and from the collar 330 to the turnhub 310 via engagement of the spline 333 with the groove 313. It is also contemplated that the unlocking torque may be transmitted from the collar 330 to the turnhub 310 in another manner. For example, the collar 330 may have another outer geometry that is non-circular about the rotational axis 301, and the turnhub 310 may have a corresponding non-circular geometry that mates with that of the collar 330. Rotation of the turnhub 310 in the unlocking direction 308 causes retraction of the deadbolt 230 as described above with reference to FIGS. 4-6.

During a typical unobstructed locking procedure, the deadbolt 230 can be moved from its retracted position to its extended position by each and either of the deadbolt actuators 130, 140. For extension of the deadbolt 230 from the non-egress side 92, the outside deadbolt actuator 140 may be actuated to rotate the turnhub 310 in the locking direction, thereby extending the deadbolt 230 as described above with reference to FIGS. 4-6. For extension of the deadbolt 230 from the egress side 91, the inside actuator 132 may be rotated in the locking direction 309, thereby causing a corresponding rotation of the spindle 320 in the locking direction 309. Such rotation of the spindle 320 in the locking direction 309 causes a corresponding rotation of the turnhub 310 in the locking direction 309. More particularly, the locking torque is transmitted from the spindle 320 to the collar 330 via engagement of the ramps 343, 347. While the oblique or helical configurations of the ramps 343, 347 cause this torque to generate a separating force distally urging the collar 330 away from the flange 325, this separating force is countered by the proximal biasing force generated by the bias member 350. As such, the ramps 343, 347 remain engaged with one another and transmit the locking torque from the spindle 320 to the collar 330. The locking torque is then transmitted from the collar 330 to the turnhub 310 (e.g., via engagement of the spline 333 with the groove 313), and rotation of the turnhub 310 in the locking direction 309 causes extension of the deadbolt 230 as described above with reference to FIGS. 4-6.

As should be evident from the foregoing, the anti-barricade mechanism 300 is configured to transmit torques in each and either rotational direction 308, 309 during typical unobstructed locking and unlocking procedures. However, it may be the case that a person on the egress side 91 of the door 90 holds the outside actuator 132 in place in an attempt to prevent retraction of the deadbolt 230 from the non-egress side 92 of the door 90. As described in further detail below, this effort at barricading the door 90 may be rendered ineffective by the systems and methods described herein.

During a barricade attempt, the user on the egress side 91 of the door 90 may hold the inside deadbolt actuator 132 in the bolt-extending position corresponding to the extended position of the deadbolt 230, thereby retaining the spindle 320 in a fixed position. Should a user on the non-egress side 92 of the door 90 attempt to actuate the outside deadbolt actuator 140 in an attempt to retract the deadbolt 230, such an attempt will exert on the turnhub 310 a torque in the unlocking direction 308. This unlocking torque is transmitted to the collar 330 (e.g., via engagement of the spline 333 with the groove 313), which results in the generation of forces between the engaged ramps 343, 347. As noted above, such forces cause the ramps 343, 347 to distally urge the collar 330 away from the flange 325.

While the separation forces are initially counteracted by the bias member 350, the separation forces overcome the biasing force of the bias member 350 when the unlocking torque exceeds a threshold torque value. When this occurs, the collar 330 begins to rotate in the unlocking direction 308, and moves distally against the bias force of the bias member 350 until the apex 344 comes into contact with the proximal side of the collar 330. At this point, continued rotation in the unlocking direction 308 of the turnhub 310 and collar 330 (e.g., by the outside deadbolt actuator 140) is permitted, and the turnhub 310 can be rotated in the unlocking direction 308 to thereby cause retraction of the deadbolt 230 as described above with reference to FIGS. 4-6. When the turnhub 310 is returned to its home position, the recess 336 aligns with the projection 326 and the bias member 350 urges the recess 336 onto the projection 326 to reset the anti-barricade mechanism 300 for further use.

Figure 11:
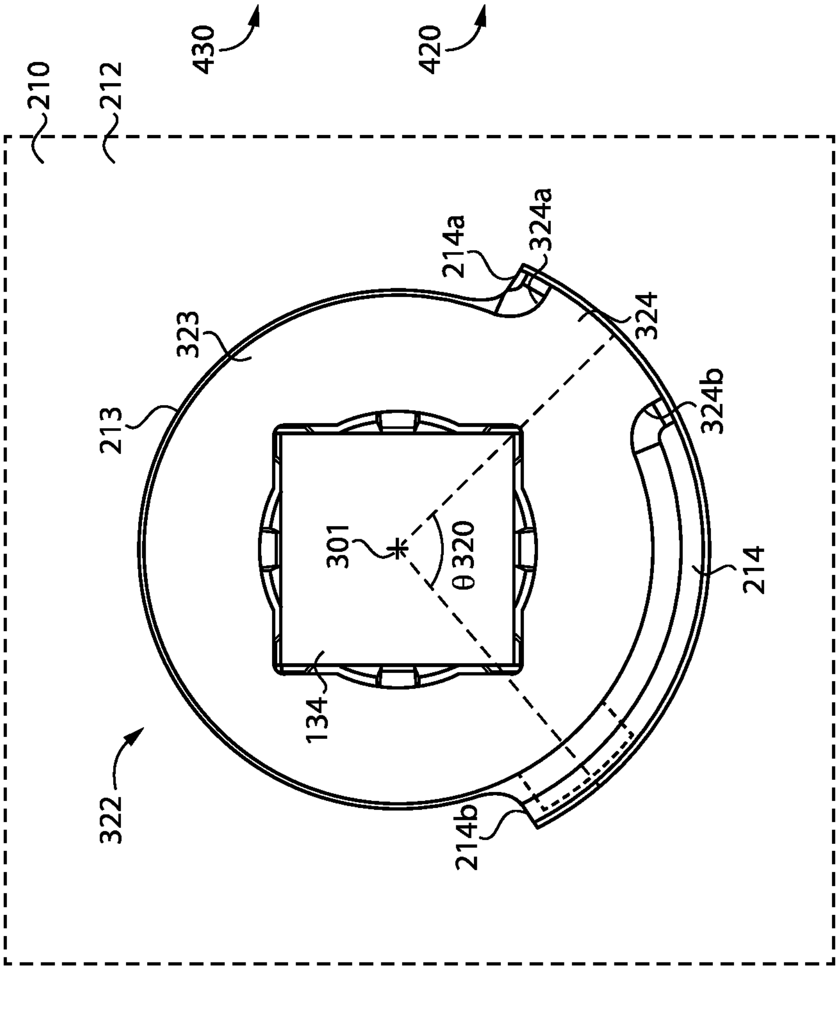
FIG. 11 is a plan view of a portion of the mortise assembly.

With additional reference to FIG. 11, it may be the case that the barricading user on the egress side 91 of the door 90 attempts to continue rotating the inside actuator 132. Such rotation, if permitted, could enable the user to extend the deadbolt 230 after the deadbolt 230 has been retracted by the person on the exterior side 92 of the door 90. However, such over-rotation is prevented in certain embodiments by one or more stop features.

As noted above, the base portion 322 of the spindle 320 is received in the support opening 213 of the housing 210. More particularly, the circular boss 323 is received in a circular portion of the support opening 213, and the spline 324 is received in an extension 214 of the support opening 213. The extension 214 is delimited in part by a first stop **214*a* and a second stop 214*b*, each of which is operable to engage a corresponding abutment surface 324*a*, 324*b* of the spline 324. While the illustrated support opening 213 is provided in the case 212 of the housing 210, it is also contemplated that the features described in association with the support opening 213 may be provided to the cover 211 of the housing, or that stops corresponding to the stops 214*a*, 214*b* may be provided elsewhere in the housing 210**.

When the spindle 320 is in a first terminal position (illustrated in solid lines), a first abutment surface **324*a* of the spline 324 is adjacent the first stop 214*a* such that the first stop 214*a* prevents further rotation of the spindle 214 in a first rotational direction. When the spindle 320 is in a second terminal position (illustrated in dashed lines), a second abutment surface 324*b* of the spline 324 is adjacent the second stop 214*b* such that the second stop 214*b* prevents further rotation of the spindle 214 in a second rotational direction opposite the first rotational direction. As such, rotation of the spindle 320 about the longitudinal rotational axis 301 is limited to a predetermined angular range θ320**. In the illustrated form, the predetermined angular range is about 90°, and may, for example, be between 80° and 100°, between 70° and 110°, or between 60° and 120°.

Figure 12:
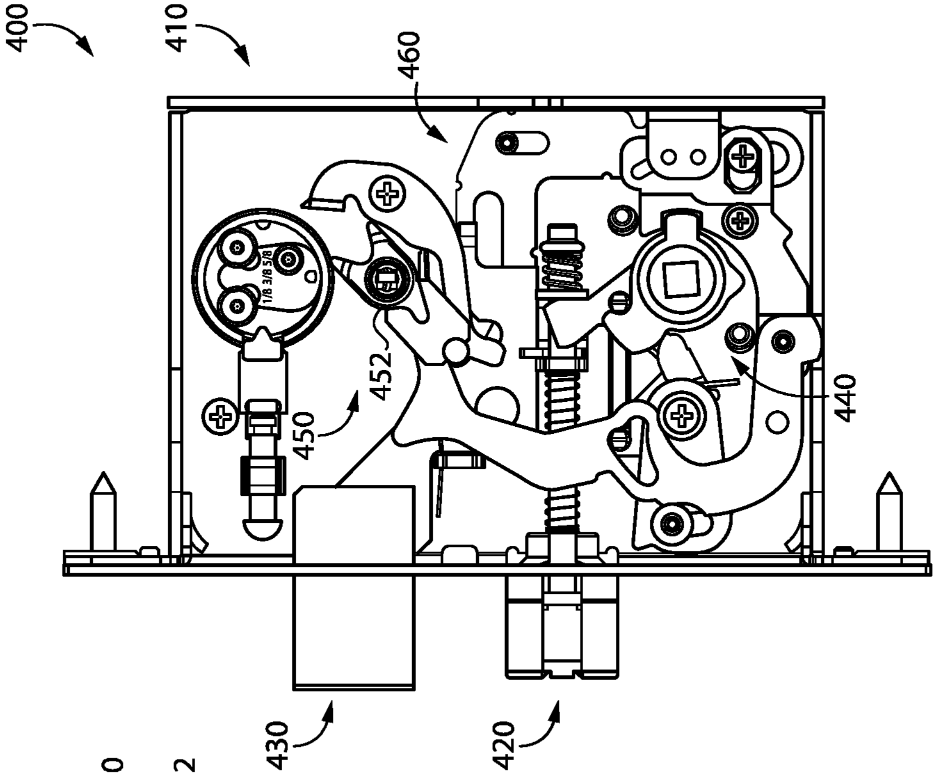
FIG. 12 is a plan view of a mortise assembly according to certain embodiments.

With additional reference to FIG. 12, illustrated therein is a mortise assembly 400 according to certain embodiments. The mortise assembly 400 is substantially similar to the mortise assembly 200, and similar reference characters are used to denote similar elements and features except where noted otherwise. For example, the mortise assembly 400 generally includes a housing 410, a latchbolt 420, a deadbolt 430, a latchbolt actuation assembly 440, a deadbolt actuation assembly 450, and a lock mechanism 460, which respectively correspond to the housing 210, the latchbolt 220, the deadbolt 230, the latchbolt actuation assembly 240, the deadbolt actuation assembly 250, and the lock mechanism 260. In the interest of conciseness, the following description of the mortise assembly 400 primarily focuses on elements and features of the mortise assembly 400 that differ from those described above with reference to the mortise assembly 200.

In the illustrated form, the deadbolt actuation assembly 450 includes a conventional turnhub 452. The turnhub 452 is configured for rotational coupling with the outside deadbolt actuator stem 134 such that the outside deadbolt actuator 132 is at all times capable of exerting torque on the turnhub. Thus, the mortise assembly 400 may be susceptible to the type of barricading attack described above. As described herein, certain embodiments of the present application relate to retrofitting an existing lockset, such as a lockset including the mortise assembly 400, with an anti-barricade mechanism such as the anti-barricade mechanism 300 in order to obviate such barricading attempts.

Figure 13:
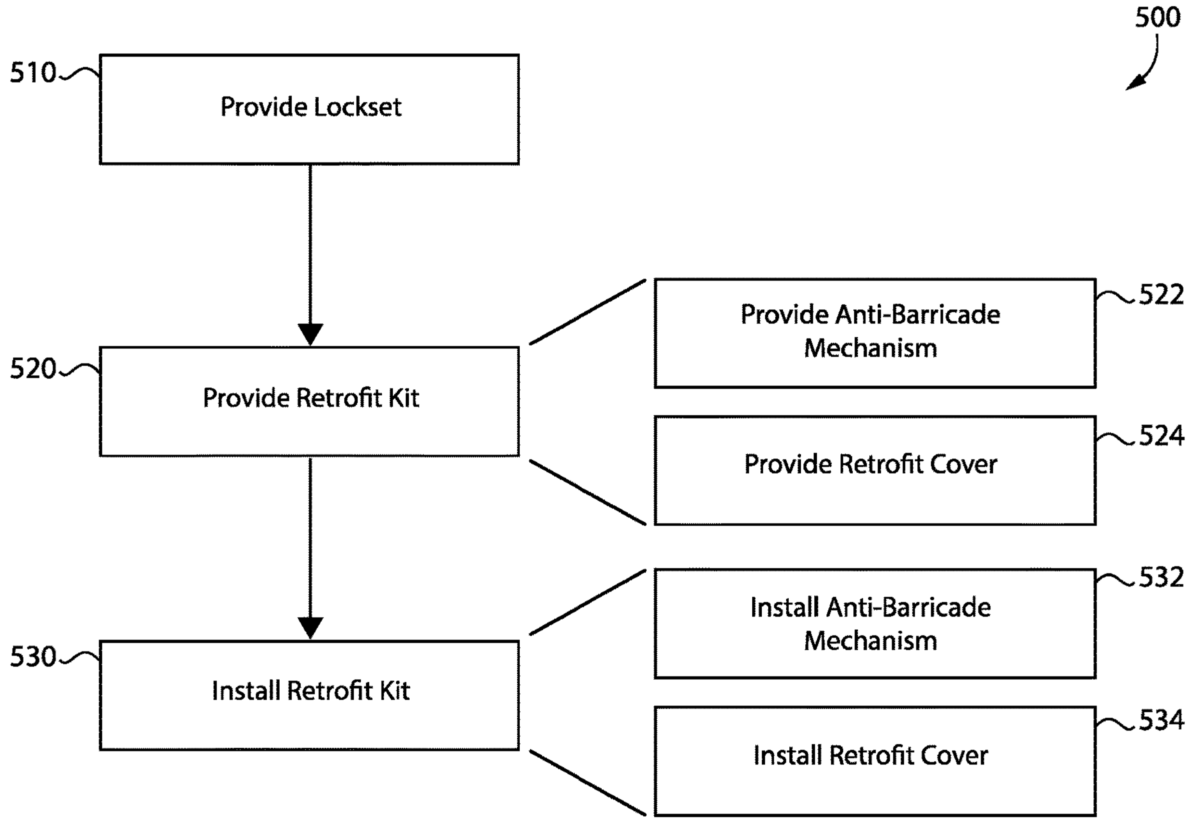
FIG. 13 is a schematic flow diagram of a process according to certain embodiments.

With additional reference to FIG. 13, illustrated therein is a process 500 according to certain embodiments. Blocks illustrated for the processes in the present application are understood to be examples only, and blocks may be combined or divided, and added or removed, as well as re-ordered in whole or in part, unless explicitly stated to the contrary. Additionally, while the blocks are illustrated in a relatively serial fashion, it is to be understood that two or more of the blocks may be performed concurrently or in parallel with one another. Moreover, while the process 500 is described herein with specific reference to the anti-barricade mechanism 300 illustrated in FIGS. 2-11 and the mortise assembly 400 illustrated in FIG. 12, it is to be appreciated that the process 500 may be performed with anti-barricade mechanisms and/or locksets having additional and/or alternative features.

The process 500 may begin with block 510, which generally involves providing a lockset including an existing turnhub. For example, block 510 may involve providing a lockset including the mortise assembly 400 illustrated in FIG. 12, which includes an existing turnhub 410. It is also contemplated that block 510 may involve providing an otherwise conventional lockset including a conventional turnhub.

The process 500 may include block 520, which generally involves providing a retrofit kit. For example, block 520 may include block 522, which generally involves providing the retrofit kit with the anti-barricade mechanism 300. In certain embodiments, block 520 may further include block 524, which involves providing the retrofit kit with a retrofit cover configured to replace the cover of the existing lockset.

For example, the retrofit kit may be provided in a form in which the spline 324 of the spindle 320 is formed on the distal end of the spindle 320, and a support opening of the retrofit cover is configured in a manner similar to that described above with reference to the support opening 213.

The process 500 may include block 530, which generally involves installing the retrofit kit to the existing lockset. In the illustrated form, block 530 includes block 532, which generally involves replacing the existing turnhub 452 with the anti-barricade mechanism 300. In certain forms, block 530 may further include block 534, which generally involves replacing the existing cover with the retrofit cover.

With the process 500 complete, the existing mortise assembly is converted to an anti-barricade mortise assembly along the lines of the mortise assembly 200. As such, the retrofitted mortise assembly is capable of discouraging barricading in a manner analogous to that described above with reference to the mortise assembly 200.

Figure 14:
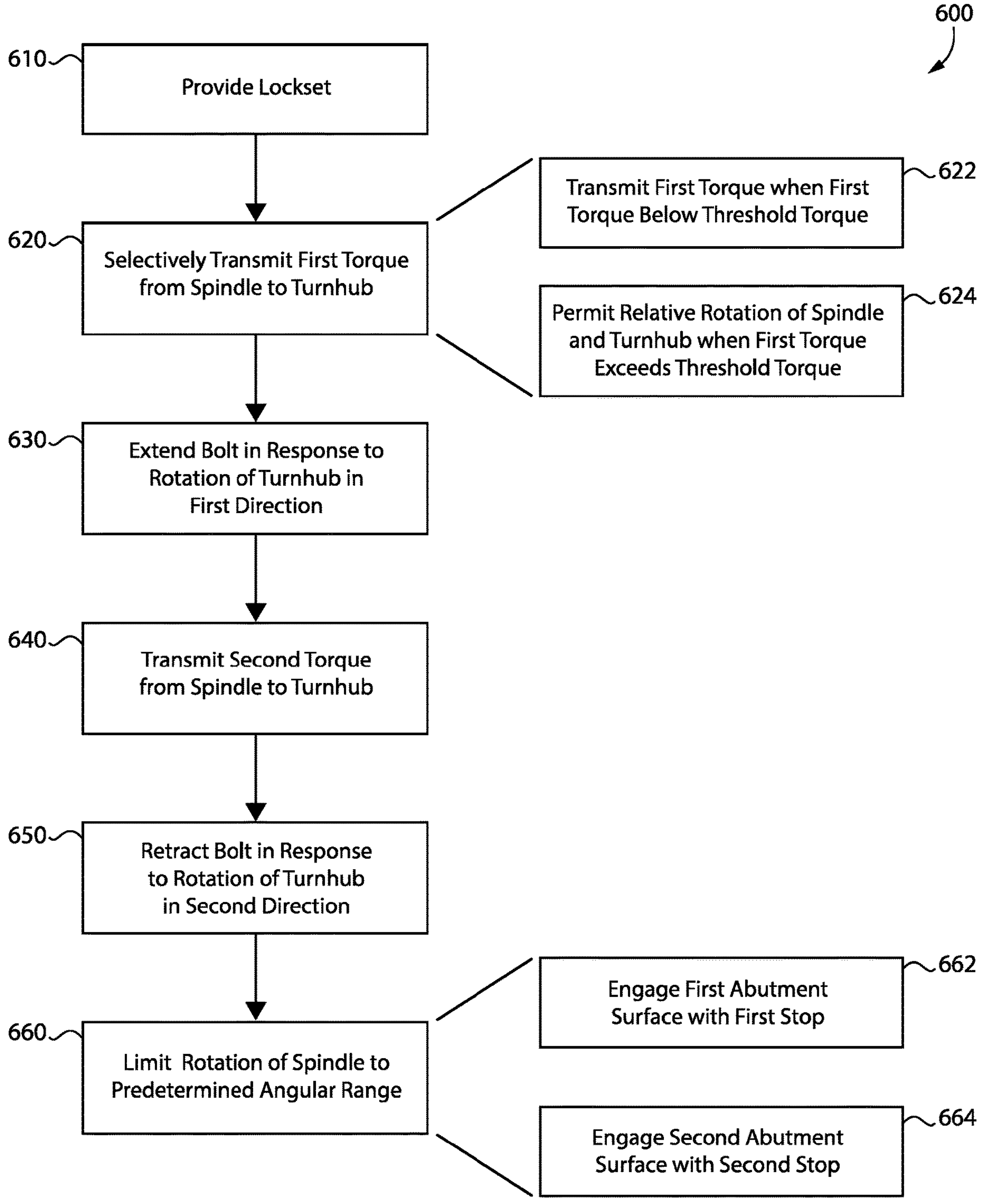
FIG. 14 is a schematic flow diagram of a process according to certain embodiments

With additional reference to FIG. 14, illustrated therein is a process 600 according to certain embodiments. Blocks illustrated for the processes in the present application are understood to be examples only, and blocks may be combined or divided, and added or removed, as well as re-ordered in whole or in part, unless explicitly stated to the contrary. Additionally, while the blocks are illustrated in a relatively serial fashion, it is to be understood that two or more of the blocks may be performed concurrently or in parallel with one another. Moreover, while the process 500 is described herein with specific reference to the lockset 100 illustrated in FIGS. 1-11, it is to be appreciated that the process 600 may be performed with locksets having additional and/or alternative features.

The process 600 may begin with block 610, which generally involves providing a lockset including a bolt, a turnhub, and a spindle. For example, block 610 may involve providing the lockset 100, which generally includes a bolt 230, a turnhub 310, and a spindle 320. In certain embodiments, the lockset provided in block 610 may include an anti-barricade mechanism including the turnhub and the spindle. For example, the lockset provided in block 610 may include the anti-barricade mechanism 300, which includes the turnhub 310 and the spindle 320. In certain embodiments, block 610 may involve providing the lockset with a housing including a pair of stops operable to limit rotation of the spindle to a predetermined angular range. For example, the housing 210 of the lockset 100 includes a pair of stops 214*a*, 214*b* configured to limit rotation of the spindle 320 to a predetermined angular range θ320.

The process 600 may include block 620, which generally involves selectively transmitting a first torque in a bolt-extending direction from the spindle to the turnhub. In the illustrated form, block 620 includes block 622 and block 624, each of which may be selectively performed based upon the level of torque being exerted on the anti-barricade mechanism.

Block 622 generally involves transmitting the first torque when the first torque is below a threshold torque, thereby causing rotation of the turnhub in the bolt-extending direction. Block 622 may, for example, be performed during the above-described unobstructed deadbolt extending procedure, in which the clutch mechanism 340 transmits a first torque in a bolt-extending or locking direction 309 from the spindle 320 to the turnhub 310 via the collar 330, thereby causing rotation of the turnhub 310 in the bolt-extending or locking direction 309.

Block 624 generally involves allowing relative rotation of the spindle and the turnhub when the first torque exceeds the threshold torque. Block 624 may, for example, be performed during a barricade attempt, in which the clutch mechanism 340 permits relative rotation of the spindle 320 and the turnhub 310, thereby permitting retraction of the deadbolt 230 by the outside deadbolt actuator 140 while such retraction is being resisted by a user holding the inside actuator 132 in place. In certain embodiments, block 624 may involve causing axial movement of a portion of the clutch mechanism 340 (e.g., the collar 330) to facilitate such rotational decoupling of the turnhub 310 and the spindle 320.

In certain embodiments, the lockset further comprises a collar engaged with the spindle and the turnhub. For example, the lockset 100 may include a collar 330 engaged with the spindle 320 and the turnhub 310. In certain embodiments, block 622 may involve a first ramp 343 of the spindle 320 remaining engaged with a second ramp 347 of the collar 330 when the first torque is below the threshold torque, thereby transmitting the first torque from the spindle 320 to the turnhub 310 via the collar 330. In such forms, block 624 may involve engagement between the first ramp 343 and the second ramp 347 causing axial movement of the collar 330 relative to the spindle 320 and the turnhub 310 when the first torque exceeds the threshold torque, thereby allowing relative rotation of the spindle 320 and the turnhub 310.

The process 600 may include block 630, which generally involves extending the bolt in response to rotation of the turnhub in the bolt-extending direction. For example, block 630 may involve extending the deadbolt 230 in response to rotation of the turnhub 310 in the bolt-extending direction as described above with reference to FIGS. 4-6.

The process 600 may include block 640, which generally involves transmitting a second torque in a bolt-retracting direction from the spindle to the turnhub to thereby rotate the turnhub in the bolt-retracting direction. For example, block 640 may involve transmitting the second torque in the bolt-retracting or unlocking direction 308 from the spindle 320 to the turnhub 310 to thereby rotate the turnhub 310 as described above with reference to the deadbolt retracting procedure.

The process 600 may include block 650, which generally involves retracting the bolt in response to rotation of the turnhub in the bolt-retracting direction. For example, block 650 may involve retracting the deadbolt 230 in response to rotation of the turnhub 310 in the bolt-retracting or unlocking direction as described above with reference to FIGS. 4-6.

The process 600 may include block 660, which generally involves limiting rotation of the spindle to a predetermined angular range. For example, block 660 may involve limiting rotation of the spindle 320 to the predetermined angular range θ320. In certain embodiments, block 660 may involve block 662 and/or block 664.

In the illustrated form, block 662 generally involves engaging a first abutment surface of the spindle with a first stop, thereby limiting rotation of the spindle in the bolt-extending direction. For example, block 662 may involve engaging the first abutment surface 324*a* with the first stop 214*a*, thereby limiting rotation of the spindle 320 in the bolt-extending or locking direction 309. In certain forms, the first abutment surface may be formed on a spline of the spindle. In certain embodiments, the first stop may be defined by the housing of the lockset.

In the illustrated form, block 664 generally involves engaging a second abutment surface of the spindle with a second stop, thereby limiting rotation of the spindle in the bolt-retracting direction. For example, block 664 may involve engaging the second abutment surface 324*b* with the second stop 214*b*, thereby limiting rotation of the spindle 320 in the bolt-retracting or unlocking direction 308. In certain forms, the second abutment surface may be formed on a spline of the spindle. In certain embodiments, the second stop may be defined by the housing of the lockset.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A lockset, comprising:

a housing;

a bolt mounted in the housing for movement between an extended position and a retracted position;

a turnhub rotatably mounted in the housing for rotation about a rotational axis and engaged with the bolt, wherein rotation of the turnhub in a bolt-extending direction drives the bolt toward the extended position, and wherein rotation of the turnhub in a bolt-retracting direction opposite the bolt-extending direction drives the bolt toward the retracted position; and a spindle engaged with the turnhub, wherein the spindle is operable to rotate about the rotational axis and exert torque on the turnhub in the bolt-retracting direction and is selectively operable to exert torque on the turnhub in the bolt-extending direction; and wherein the housing includes a pair of stops configured to abut the spindle to limit rotation of the spindle to a predetermined angular range.

2. The lockset of claim 1, further comprising a first bolt actuator, wherein the first bolt actuator is rotationally coupled with the spindle and is operable to rotate the spindle in each of the bolt-extending direction and the bolt-retracting direction.

3. The lockset of claim 2, further comprising a second bolt actuator, wherein the second bolt actuator is operable to rotate the turnhub in each of the bolt-extending direction and the bolt-retracting direction.

4. The lockset of claim 3, wherein the first bolt actuator comprises a thumbturn; and wherein the second bolt actuator comprises a lock cylinder.

5. The lockset of claim 1, wherein the spindle includes a spline operable to engage the pair of stops.

6. The lockset of claim 1, further comprising a clutch mechanism, and wherein the clutch mechanism is configured to limit transmission of torque from the spindle to the turnhub in the bolt-extending direction to a threshold torque.

7. A lockset, comprising:

a housing;

a bolt mounted in the housing for movement between an extended position and a retracted position;

a turnhub rotatably mounted in the housing and engaged with the bolt, wherein rotation of the turnhub in a bolt-extending direction drives the bolt toward the extended position, and wherein rotation of the turnhub in a bolt-retracting direction opposite the bolt-extending direction drives the bolt toward the retracted position; and a spindle engaged with the turnhub, wherein the spindle is operable to exert torque on the turnhub in the bolt-retracting direction and is selectively operable to exert torque on the turnhub in the bolt-extending direction;

wherein the housing includes a pair of stops configured to limit rotation of the spindle to a predetermined angular range;

wherein the housing comprises an opening defined in part by the pair of stops;

wherein the spindle comprises a boss and a spline extending along the boss; and wherein the boss is received in the opening, and the spline is operable to engage the stops.

8. The lockset of claim 1, wherein the predetermined angular range is between 80° and 100°.

9. An anti-barricade mechanism, comprising:

a turnhub;

a spindle rotatably mounted in the turnhub;

a collar rotatably mounted on the spindle, wherein the collar is rotationally coupled with the turnhub and is axially movable relative to the turnhub; and a clutch mechanism, comprising:

a first clutch component, wherein the first clutch component comprises a first ramp, and wherein one of the spindle or the collar comprises the first clutch component; and a second clutch component, wherein the other of the spindle or the collar comprises the second clutch component; and a bias member urging the clutch mechanism toward an engaged state in which the first clutch component and the second clutch component are engaged with one another;

wherein the clutch mechanism is configured to selectively transmit a first torque in a first direction from the spindle to the collar to thereby rotate the turnhub in the first direction;

wherein, when the first torque is below a threshold torque value, the first ramp causes transmission of the first torque from the spindle to the collar; and wherein, when the first torque exceeds the threshold torque value, the first ramp causes axial movement of the collar against the urging of the bias member to thereby permit relative rotation of the spindle and the turnhub.

10. The anti-barricade mechanism of claim 9, wherein the second clutch component further comprises a second ramp that is engaged with the first ramp when the clutch mechanism is in the engaged state.

11. The anti-barricade mechanism of claim 9, wherein the first clutch component further comprises a first shoulder;

wherein the second clutch component comprises a second shoulder; and wherein, with the clutch mechanism in the engaged state, the first shoulder is operable to engage the second shoulder to thereby transmit a second torque in a second direction from the spindle to the collar to thereby rotate the turnhub in the second direction.

12. The anti-barricade mechanism of claim 9, wherein the spindle includes a spline operable to engage a pair of stops to thereby limit rotation of the spindle to a predetermined angular range.

13. The anti-barricade mechanism of claim 9, wherein the first clutch component comprises a projection defined at least in part by the first ramp; and wherein the second clutch component comprises a recess sized and shaped to receive the projection.

14. The anti-barricade mechanism of claim 9, wherein one of the turnhub or the collar comprises a groove;

wherein the other of the turnhub or the collar comprises a spline; and wherein the spline is received in the groove such that the spline and the groove rotationally couple the turnhub with the collar while permitting axial movement of the collar relative to the turnhub.

15. A lockset comprising the anti-barricade mechanism of claim 9, the lockset further comprising:

a housing; and a bolt mounted in the housing for movement between an extended position and a retracted position;

wherein the turnhub is engaged with the bolt;

wherein rotation of the turnhub in the first direction moves the bolt toward the extended position; and wherein rotation of the turnhub in a second direction opposite the first direction moves the bolt toward the retracted position.

16. A method of operating a lockset comprising a bolt, a turnhub, and a spindle, the method comprising:

selectively transmitting a first torque in a bolt-extending direction from the spindle to the turnhub, wherein the selectively transmitting comprises:

transmitting the first torque when the first torque is below a threshold torque, thereby causing rotation of the turnhub in the bolt-extending direction; and allowing relative rotation of the spindle and the turnhub when the first torque exceeds the threshold torque;

extending the bolt in response to rotation of the turnhub in the bolt-extending direction; and limiting rotation of the spindle to a predetermined angular range.

17. The method of claim 16, wherein limiting rotation of the spindle to a predetermined angular range comprises:

engaging a first abutment surface of the spindle with a first stop, thereby limiting rotation of the spindle in the bolt-extending direction; and engaging a second abutment surface of the spindle with a second stop, thereby limiting rotation of the spindle in a bolt-retracting direction opposite the bolt-extending direction.

18. The method of claim 17, wherein each of the first stop and the second stop is defined by a housing of the lockset.

19. The method of claim 16, further comprising transmitting a second torque in a bolt-retracting direction from the spindle to the turnhub to thereby rotate the turnhub in the bolt-retracting direction; and retracting the bolt in response to rotation of the turnhub in the bolt-retracting direction.

20. The method of claim 16, wherein the lockset further comprises a collar engaged with the spindle and the turnhub;

wherein a first ramp of the spindle remains engaged with a second ramp of the collar when the first torque is below the threshold torque, thereby transmitting the first torque from the spindle to the turnhub via the collar; and wherein engagement between the first ramp and the second ramp causes axial movement of the collar relative to the spindle and the turnhub when the first torque exceeds the threshold torque, thereby allowing relative rotation of the spindle and the turnhub.

21. The lockset of claim 1, wherein the housing comprises an opening defined in part by the pair of stops, and wherein a portion of the spindle is received in the opening and includes an abutment operable to engage the pair of stops.

* * * * *